United States Patent [19]
Scherf

[11] 3,710,938
[45] Jan. 16, 1973

[54] APPARATUS AND METHOD FOR MEASURING THE RATE OF CHANGE OF THICKNESS OF DIELECTRIC MEMBERS

[75] Inventor: Gerald F. Scherf, Holland, Ohio
[73] Assignee: Owens-Illinois, Inc.
[22] Filed: Nov. 29, 1971
[21] Appl. No.: 202,767

[52] U.S. Cl. ............................................. 209/111.5
[51] Int. Cl. .................................................. B07c 5/34
[58] Field of Search ............... 209/73, 111.5, 111.7; 324/58.5 R, 58.5 A; 356/240; 250/223 B, 83.3 D

[56] References Cited

UNITED STATES PATENTS

| | | | |
|---|---|---|---|
| 3,393,799 | 7/1968 | Schmersal | 209/73 |
| 3,379,306 | 4/1968 | Mathias et al. | 209/111.5 |
| 3,602,715 | 7/1971 | McDivitt | 209/111.5 |

Primary Examiner—Allen N. Knowles
Assistant Examiner—Gene A. Church
Attorney—D. T. Innis et al.

[57] ABSTRACT

Apparatus for detecting the presence of relatively narrow, thin sections in the sidewall of glass containers and rejecting those containers which exhibit such narrow, thin sections. A radio frequency source coupled to a transmitting antenna positioned adjacent the container establishes a radio frequency field extending through the wall of the glass container. The wall of the container is moved relative to a receiving probe. The instantaneous magnitude of the field received by the probe provides an indication of the thickness of the container sidewall. The signal received is amplified and the first derivative of the voltage with respect to time is taken. The rate of change of the voltage is a direct indication of the change in thickness of successive sections of the container sidewall being gauged. Those containers which exhibit a rate of change of voltage with respect to time above a preset level are rejected as being defective.

10 Claims, 5 Drawing Figures

INVENTOR.
GERALD F. SCHERF

APPARATUS AND METHOD FOR MEASURING THE RATE OF CHANGE OF THICKNESS OF DIELECTRIC MEMBERS

BACKGROUND OF THE INVENTION

This invention generally relates to the inspection of glass containers. More specifically, this invention relates to the measurement of the thickness of the sidewall of glass containers using radio frequency energy. Most specifically, this invention relates to the detection of relatively narrow, thin sections in the sidewall of glass containers using radio frequency energy transmitted through the wall of the glass container and received by a sensing probe.

The use of radio frequency energy to inspect glass containers and measure the thickness of the sidewalls of such containers is known in the art and is disclosed in patents such as U.S. Pat. Nos. 3,379,306 and 3,393,799. Both of these patents disclose systems which are generally suitable for detecting the presence of relatively large, thin areas in the sidewalls of glass containers, and have met with substantial commercial success. However, the basic electronic measuring systems disclosed in these two patents is such that defects in the glass container sidewall which result in relatively narrow, yet thin sections, may go undetected by the apparatus. This failure is attributed to an averaging effect of the sensing probe which sees an electrical field of a finite diameter causing narrow, thin sections to be averaged in with thicker sections on either side to give an overall reading which is satisfactory. Such defects are commonly known in the glass container industry as "ribbon tears" and "blowouts." I have found that the rate of change of the voltage indicated the thickness of the container may be utilized to determine the presence of such defects which now go undetected by the present glass wall thickness measuring apparatus.

SUMMARY OF THE INVENTION

This invention is an improvement in an apparatus of the type which sorts articles made of a dielectric material according to the thickness by measuring the voltage attenuation of a radio frequency field passing through the article. The invention is a means for rejecting those articles which exhibit a rate of change of thickness, as indicated by the rate of change of the attenuated voltage, greater than a preselected value.

DESCRIPTION OF THE PREFERRED EMBODIMENT

Figure 1:
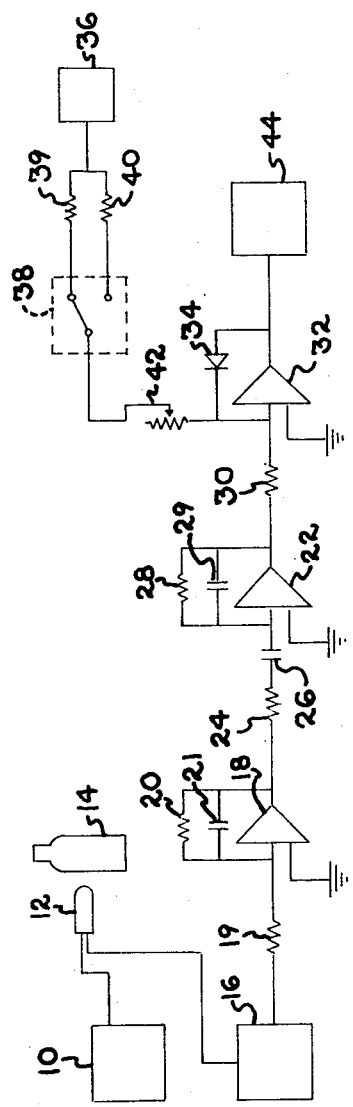
FIG. 1 is a schematic representation of one embodiment of the apparatus of the invention.

The apparatus of the present invention is designed to be used in conjunction with the handling and radio frequency transmitting and receiving apparatus disclosed in U.S. Pat. Nos. 3,379,306 and 3,393,799, which are herein incorporated by reference. In particular, both of the cited patents teach the transmission of radio frequency energy through the sidewall of a glass container and sensing of the field strength as an indication of the thickness of the container over an area. This invention is concerned with apparatus for processing the signal representing the thickness of the sidewall of the glass container. With particular reference to FIG. 1, a radio frequency oscillator 10, which preferably operates in the order of 13,560,000 $H_z$, is connected to a probe assembly 12. The probe assembly 12 is positioned to interact with a rotating glass container 14 in the manner described in U.S. Pat. Nos. 3,379,306 and 3,393,799. The probe assembly 12 will sense a signal proportional to the thickness of the sidewall of the container 14 and this signal is transmitted to an I-F amplifier 16. Up to this point, the circuit is identical to that described in the two cited patents, which are incorporated by reference. The circuit, hereinafter described, may be used independently of the circuit in the two cited patents or may be used in parallel with those circuits, by providing two outputs from the I-F amplifier 16. An operational amplifier 18 is connected to the I-F amplifier 16 with an input resistor 19 interposed between the I-F amplifier 16 and the operational amplifier 18. The operational amplifier 18, since it is being used as a multiplier, also has a feedback resistor 20 connected in a feedback loop. A noise-suppressing capacitor 21 is also connected in parallel with the feedback resistor 20. The output of the operational amplifier 18 is fed to a second operational amplifier 22. There is provided in series in the circuit from the operational amplifier 18 to the operational amplifier 22, a second input resistor 24 and a differentiating capacitor 26. Those familiar with the operation of operational amplifiers will recognize that the provision of the differentiating capacitor 26 on the input side of the operational amplifier 22 enables the operational amplifier 22 to operate as a differentiator. That is, the output of the operational amplifier 22 will be the first derivative with respect to time of the output of the operational amplifier 18. A second feedback resistor 28 is connected in a feedback loop around the operational amplifier 22 in parallel with a second noise-limiting capacitor 29. The output from the second operational amplifier 22 is connected by a third input resistor 30 to a third operational amplifier 32 which is used as a half-swing level detector. A diode 34 in a feedback loop of the third operational amplifier 32 is used as a clamping diode to prevent the output of the third operational amplifier 32 from swinging both directions, thereby defining the half-swing level detector. A preselected voltage, for example 15 volts, is furnished by a voltage source 36. The voltage source 36 is connected to a multiple-pole switch 38. Each pole of the multiple-pole switch 38 is connected to the voltage source 36 through an independent resistor such as 39 or 40. The output of the multiple-pole switch 38 is connected to a potentiometer 42 whose output in turn is connected to the input terminal of the third operational amplifier 30. The combination of the voltage source 36 and a fixed resistor, for example 39 as shown in FIG. 1, and the resistance set on the potentiometer 42 in combination with the third input resistor 30 will present a fixed voltage to the input terminal of the third operational amplifier 32 and thereby provide a predetermined biasing voltage. The purpose of providing multiple fixed resistors such as 39 and 40 is to allow rapid change from one sensitivity range to another as different containers are inspected by this apparatus. That is, the voltage necessary to bias the operational amplifier 32 may be different for different types of containers. Thus, the use of a multiple-pole switch allows rapid change from one container to another. The potentiometer 42 is used as a fine-tuning element to precisely set the voltage level desired in the third operational amplifier 32. This voltage level determines the rejection level voltage. So long as the output of the second operational amplifier 22 is less than the biasing voltage for the third operational amplifier 32, there will be no output from the third operational amplifier 32. However, should the voltage output from the second operational amplifier 22 rise above this value, an output will be given by the third operational amplifier 32 and transmitted to a rejection mechanism 44, thereby causing the rejection of a container causing such a signal voltage.

Figure 3:
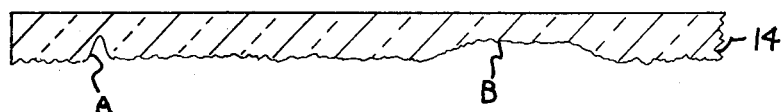
FIG. 3 is a schematic representation of a container sidewall.
Figure 4:
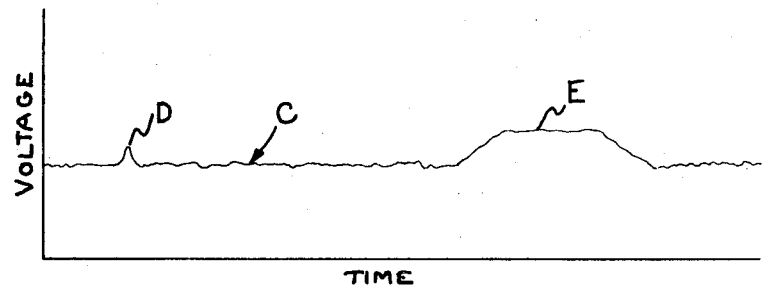
FIG. 4 is a chart showing the relationship of voltage to time as sensed by the sensing probe.
Figure 5:
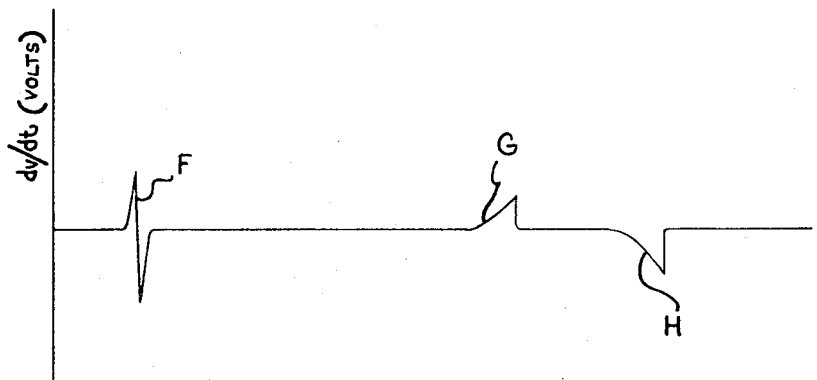
FIG. 5 is a chart showing the rate of change of voltage with respect to time on a time scale.

Turning now to FIGS. 3, 4 and 5, the operating principles of this apparatus may be readily appreciated. FIG. 3 is a schematic representation of a cross-section through the sidewall of a glass container 14 laid out flat rather than in its normal circular configuration. It may be seen that there are two relatively thin sections designated as A and B in the sidewall of the container 14. Thin section A is of the type which may be detected by the apparatus of the present invention but which is essentially invisible to the apparatus of the prior art. Thin section B is of the type which may be readily detected by the apparatus of the prior art. It will be noted that the interior surface of the container 14 is not completely smooth but exhibits a rippling appearance. Relatively narrow, thin spots such as that designated A are not sensed by the apparatus of the prior art due to the fact that the diameter of the electrical field sensed by the probe assembly 12 averages relatively thicker portions on either side of the thin section in with the thin section A to give an overall reading of an acceptable thickness level. Thus, in a sense, the measuring apparatus is deceived as to the actual occurrence of a relatively narrow, thin section such as A. It should be noted again at this point, that the probe assembly 12 is held stationary while the container 14 is rotated past the probe assembly 12 to thereby give a scan of the cylindrical portion of the container 14 sidewall. A thin section such as that designated by B may be sensed by the apparatus of the prior art, since the width of the thin section B is appreciable with respect to the size of the field sensed by the probe assembly 12 and the relatively thicker portions on either side of the thin section B are not averaged to give a deceptive reading. FIG. 4 illustrates the voltage output of the operational amplifier 18 for a complete scan of the sidewall of the container 14 shown in FIG. 3. It will be noted that the base wave form C exhibits the rippling characteristic of the interior surface of the container 14. In addition, it may be seen that there is a small voltage rise indicated as D at the point at which the thin section A appears, and a much larger voltage rise, indicated as E, at the point where the thin section B appears. If the rejection level of the prior art mechanism is set to reject containers exhibiting a voltage above a particular level, it may be appreciated that the small voltage rise resulting from the thin section A and indicated by the wave form D would not rise above such a value, as previously indicated. However, the voltage rise indicated by the wave form E generated in response to the thin section B could rise above this preset rejection level and cause the container 14 to be rejected.

FIG. 5 clearly illustrates how the present apparatus overcomes this difficulty of the prior art apparatus in sensing relatively narrow, thin sections such as that designated as A in FIG. 3.

It should be clear that if both the narrow, thin section A and the wide, thin section B have the same absolute minimum thickness, the rate of change of thickness must be much greater for section A than for section B. This factor is taken into account by electronically taking the first derivative with respect to time of the voltage output of the operational amplifier 18. Thus, FIG. 5 is a representation of the voltage output of the operational amplifier 22. It may be seen, that while the thin section A gave only a minor voltage output D in FIG. 4, the rate of change as represented in FIG. 5 by wave form F is quite large. This voltage then may be used to overcome the bias of the third operational amplifier 32, resulting in an output pulse and a rejection of the container 14 by the rejection mechanism 44. Conversely, the thin section B exhibits a relatively slow rate of change of thickness as illustrated by the wave forms G and H. These wave forms may not exceed the preset biasing level, and thereby would not necessarily cause the container to be rejected by the apparatus of the present invention. However, such a relatively wide, thin spot B could be readily detected by the apparatus of the prior art. In addition, if the thin section B, in addition to being relatively wide, also exhibited a relatively sharp rate of change of thickness, a wave form similar to that illustrated as F would be generated, resulting in a rejection of the container 14 on this basis as well.

It has been found that the seams of glass containers 14 may cause a false reading, indicating a thin section which, in fact, does not exist. This false reading is generally caused by irregular seams mechanically disturbing the positioning of the sensing probe 12. However, I have found that this type of false signal may be readily distinguished and effectively filtered from the electronic circuitry by proper selection of band pass filters. Therefore, the second operational amplifier 22 has been provided with cutoff frequencies of 15.9 hertz and 1.59 hertz. Experience has shown that the majority of defects which are to be detected by this apparatus will fall within these two frequency ranges. The high and low frequency cutoffs may be readily calculated by use of the following well-known formulas:

$$F_{high} = \frac{1}{[2\pi(R_{24})(C_{26})]}, F_{low} = \frac{1}{[2\pi(R_{28})(C_{26})]}, \text{ where}$$

$R_{24}$ is the value of the resistor 24, $R_{28}$ is the value of the resistor 28, and $C_{26}$ is the value of the capacitor 26.

Figure 2:
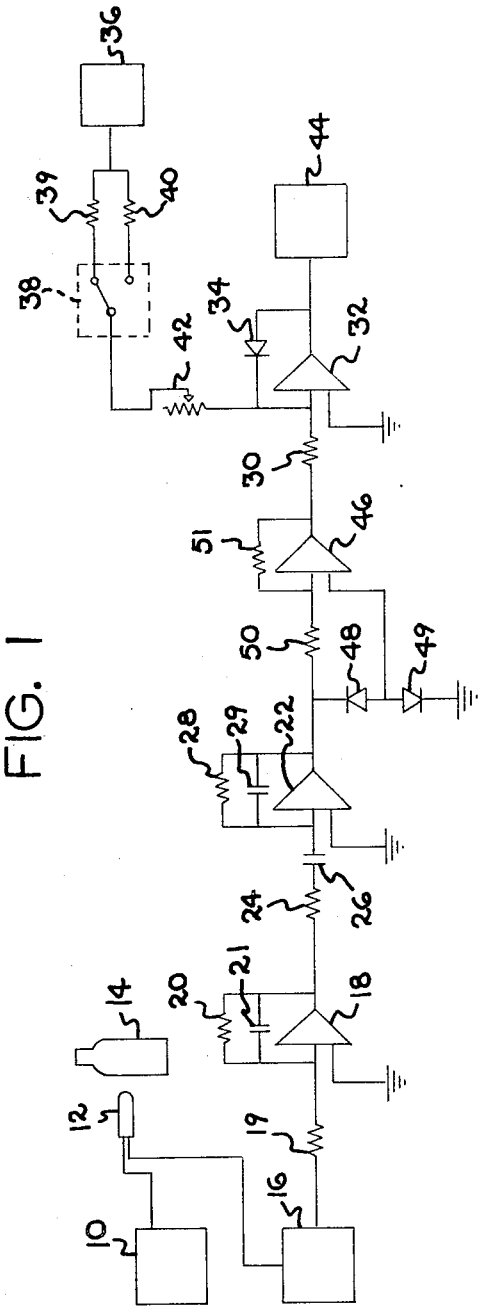
FIG. 2 is a schematic representation of a second embodiment of the apparatus shown in FIG. 1.

FIG. 2 illustrates a modification of the embodiment shown in FIG. 1 with the addition of a fourth operational amplifier 46 interposed in circuit between the second operational amplifier 22 and a third operational amplifier 32. The operational amplifier 46 is connected to function as an absolute value amplifier. That is, the two diodes 48 and 49 function to assure that the output voltage of the operational amplifier 46 will be equal to the input voltage in amplitude but will be positive going for both positive and negative inputs to the fourth operational amplifier 46. In addition, the conventional input resistor 50 is provided as well as a conventional feedback resistor 51. This function allows containers 14 exhibiting thin areas to be rejected on the basis of the probe 12 sensing either the beginning or the end of the thin section. Without the absolute value amplifier, only the rate of change of thickness of the beginning of a thin area could be detected. While this is adequate for the vast majority of such thin areas, some areas may exhibit the undesirable rapid thickness change at the end of the area, thus making the use of the absolute value amplifier desirable.

What I claim is:

1. In combination with an apparatus for measuring the thickness of an article formed of a dielectric material of the type wherein an antenna is used to establish a radio frequency field outwardly in the direction of an article positioned adjacent thereto, wherein a probe is positioned extending into said field adjacent said article, and wherein the voltage induced in said probe is an index of the thickness of that portion of said article immediately in front of said probe, wherein the improvement comprises, means connected to said probe for generating a signal proportional to the rate of change of thickness of said article, and means connected to said signal generating means for discarding those articles which exhibit a rate of change of thickness, as indicated by said generated signal, greater than a preselected value.

2. The improvement of claim 1, wherein said means for generating a signal proportional to the rate of change of thickness of said article comprises, an I-F amplifier connected to said probe, means connected to said I-F amplifier for multiplying the voltage output of said I-F amplifier, and means connected to said multiplying means for generating the first derivative with respect to time of said multiplied voltage.

3. The improvement of claim 2, wherein said means for multiplying the voltage output of said I-F amplifier comprises, an operational amplifier connected to the output terminal of said I-F amplifier, an input resistor interposed in circuit between said I-F amplifier output terminal and the input terminal to said operational amplifier, a feedback resistor connected in a feedback loop between the input and output terminal of said operational amplifier, and a noise suppression capacitor connected in parallel with said feedback resistor.

4. The improvement of claim 2, wherein said means for generating the first derivative with respect to time of said multiplied voltage comprises, an operational amplifier connected to said means for multiplying the voltage output of said I-F amplifier, an input resistor and a differentiating capacitor connected in series between said means for multiplying the voltage output of said I-F amplifier and the input of said operational amplifier, a feedback resistor connected in a feedback loop between the input terminal and output terminal of said operational amplifier, and a noise suppression capacitor connected in parallel with said feedback resistor.

5. The improvement of claim 2, further including means connected in circuit between said means for generating the first derivative with respect to time of said multiplied voltage and said means for discarding those articles which exhibit a rate of change of thickness greater than a preselected value for taking the absolute value of said first derivative with respect to time.

6. The apparatus of claim 1, wherein said means for discarding those articles which exhibit a rate of change of thickness greater than a preselected value comprises, means for generating an output signal when said rate of change of thickness, as indicated by said signal proportional to the rate of change of thickness of said article, exceeds a preselected value, and means responsive to said output signal for rejecting articles upon receipt of said output signal.

7. The improvement of claim 6, wherein said means for generating an output signal when said rate of change of thickness exceeds a pre-selected value comprises, an operational amplifier connected to said means for generating a signal proportional to the rate of change of thickness of said article, an input resistor interposed in circuit between said means for generating a signal proportional to the rate of change of thickness of said article and the input terminal of said operational amplifier, means connected to the input terminal of said operational amplifier for biasing said operational amplifier in a nonconducting mode, and a diode connected in a feedback loop from the input terminal to the output terminal of said operational amplifier for allowing current flow only from said output terminal to said input terminal.

8. The improvement of claim 7, wherein said means for biasing said operational amplifier comprises, a voltage source, a plurality of resistors of different values connected in parallel to said voltage source, a multiple pole switch connected to said plurality of resistors for selecting one of said resistors, and a potentiometer connected to the output terminal of said multiple pole switch and the input terminal of said operational amplifier, whereby a variable biasing voltage is provided at the input terminal of said operational amplifier.

9. A method of sorting articles made from dielectric materials based on the rate of change of the thickness of such articles comprising the steps of: (a) establishing a radio frequency field in close proximity to a limited surface area of said article so that said field will pass into said article; (b) moving said article relative to said field to expose a selected surface area of said article to said field; (c) positioning a probe in the same plane as said field and centrally of said field such that a voltage will be induced in said probe indicative of the thickness of said article; (d) amplifying said induced voltage; (e) electronically producing the first derivative with respect to time of said induced voltage; (f) electronically comparing said first derivative with respect to time of said induced voltage with a preselected voltage level; and (g) rejecting those articles which exhibit a rate of change of thickness as represented by said first derivative with respect to time of said induced voltage greater than that represented by said preselected voltage level.

10. A method of sorting articles made from dielectric materials, based on the rate of change of thickness of such articles, comprising the steps of:
   a. establishing a radio frequency field in close proximity to a limited surface area of said article so that said field will pass into said article;

b. moving said article relative to said field to expose a selected surface area of said article to said field;
c. positioning a probe in the same plane as said field and centrally of said field such that a voltage will be induced in said probe indicative of the thickness of said article;
d. amplifying said induced voltage;
e. electronically producing the first derivative with respect to time of said induced voltage;
f. electronically generating the absolute value of said first derivative with respect to time of said induced voltage;
g. electronically comparing said absolute value of said first derivative with respect to time of said induced voltage with a preselected voltage level; and
h. rejecting those articles which exhibit a rate of change of thickness as represented by said absolute value of said first derivative with respect to time of said induced voltage greater than that represented by said preselected voltage level.

* * * * *